US007193559B2

(12) United States Patent
Ford et al.

(10) Patent No.: US 7,193,559 B2
(45) Date of Patent: Mar. 20, 2007

(54) INERTIAL GPS NAVIGATION SYSTEM WITH MODIFIED KALMAN FILTER

(75) Inventors: Thomas John Ford, Calgary (CA); Jason Hamilton, Calgary (CA); Michael Bobye, Calgary (CA)

(73) Assignee: NovAtel, Inc., Calgary (CA)

( * ) Notice: Subject to any disclaimer, the term of this patent is extended or adjusted under 35 U.S.C. 154(b) by 137 days.

(21) Appl. No.: 10/758,363

(22) Filed: Jan. 15, 2004

(65) Prior Publication Data

US 2004/0150557 A1 Aug. 5, 2004

Related U.S. Application Data

(60) Provisional application No. 60/441,612, filed on Jan. 21, 2003.

(51) Int. Cl.
*G01S 5/14* (2006.01)

(52) U.S. Cl. ............. 342/357.14; 701/216; 342/357.11

(58) Field of Classification Search ........... 342/357.14; 701/216

See application file for complete search history.

(56) References Cited

U.S. PATENT DOCUMENTS

| | | | | |
|---|---|---|---|---|
| 5,543,804 | A * | 8/1996 | Buchler et al. | 342/357.08 |
| 5,923,286 | A | 7/1999 | Divakaruni | |
| 6,122,595 | A | 9/2000 | Varley | |
| 6,278,945 | B1 * | 8/2001 | Lin | 701/216 |
| 6,664,923 | B1 | 12/2003 | Ford | |
| 6,721,657 | B2 * | 4/2004 | Ford et al. | 701/213 |
| 2004/0239560 | A1 * | 12/2004 | Coatantiec et al. | 342/357.14 |

FOREIGN PATENT DOCUMENTS

WO WO 01/94971 A1 * 12/2001

OTHER PUBLICATIONS

Kim, Jinwon et al, "A Complete GPS/INS Integration Technique Using GPS Carrier Phase Measurements," IEEE PLANS 1998, Apr. 1998, pp. 526-533.*

(Continued)

*Primary Examiner*—Gregory C. Issing
(74) *Attorney, Agent, or Firm*—Cesari and McKenna, LLP

(57) ABSTRACT

An inertial ("INS")/GPS receiver includes an INS subsystem which incorporates, into a modified Kalman filter, GPS observables and/or other observables that span previous and current times. The INS filter utilizes the observables to update position information relating to both the current and the previous times, and to propagate the current position, velocity and attitude related information. The GPS observable may be delta phase measurements, and the other observables may be, for example, wheel pick-offs (or counts of wheel revolutions) that are used to calculate along track differences, and so forth. The inclusion of the measurements in the filter together with the current and the previous position related information essentially eliminates the effect of system dynamics from the system model. A position difference can thus be formed that is directly observable by the phase difference or along track difference measured between the previous and current time epochs. Further, the delta phase measurements can be incorporated in the INS filter without having to maintain GPS carrier ambiguity states. The INS sub-system and the GPS sub-system share GPS and INS position and covariance information. The receiver time tags the INS and any other non-GPS measurement data with GPS time, and then uses the INS and GPS filters to produce INS and GPS position information that is synchronized in time. The GPS/INS receiver utilizes GPS position and associated covariance information and the GPS and/or other observables in the updating of the INS filter. The INS filter, in turn, provides updated system error information that is used to propagate inertial current position, velocity and attitude information. Further, the receiver utilizes the inertial position, velocity and covariance information in the GPS filters to speed up GPS satellite signal re-acquisition and associated ambiguity resolution operations

5 Claims, 4 Drawing Sheets

OTHER PUBLICATIONS

Bucher R J et al: "Design and test of a synergistic interferometric GPS-INS" Position Location and Navigation Symposium, 1996, IEEE 1996 Atlanta, GA, USA Apr. 22-26, 1996, pp. 612-619.

Knight D T: "Rapid Development of Tightly-Coupled GPS/INS Systems", IEEE Aerospace and Electronic System Magazine, Feb. 1997, IEEE Inc., New York, US vol. 12, No. 2, pp. 14-18.

* cited by examiner

INERTIAL GPS NAVIGATION SYSTEM WITH MODIFIED KALMAN FILTER

CROSS-REFERENCE TO RELATED APPLICATIONS

The present application claims the benefit of U.S. Provisional Patent Application Ser. No. 60/441,612, which was filed on Jan. 21, 2003, by Thomas John Ford et al. for a MEMS INERTIAL ON RTK GPS RECEIVER and is hereby incorporated by reference.

BACKGROUND OF THE INVENTION

1. Field of the Invention

The invention relates generally to GPS receivers and, more particularly, to GPS receivers that incorporate inertial systems.

2. Background Information

A global positioning system (GPS) receiver requires signals from a number of GPS satellites in order to accurately calculate its position. The GPS receiver acquires and tracks signals consisting of carrier, pseudo random codes and modulated data from various satellites. The receiver correlates locally-generated codes with the codes received from the respective satellites to derive timing information relating the receiver time relative to the local generation of code chips to the satellite time at the times of the transmission of the corresponding code chips. The timing relationship between the receiver time and the transmission times of the various signals at the various satellites can be used in conjunction with the modulated data from the various satellites to generate a position of the receiver with respect to a reference frame shared with the satellites, for example, the earth centered earth fixed (ECEF) frame.

At least 4 satellites are required to provide a GPS position solution. Corrections to pseudo random measurements with respect to a fixed position, which is generated at a "base station" receiver, can be used to derive a relative position of the local receiver with respect to the base station position. Carrier measurements taken at the base station and the local receiver can be mixed in a known manner to generate precise relative position measurements, provided sufficient signals are available either instantaneously or over time to make it possible to resolve associated initial ambiguities of the carrier measurements. Specifically, the ambiguities can be used in conjunction with the current carrier measurements to generate the differences in geometric distances between the local receiver, the base station receiver and the various satellites whose signals are, at the time, being tracked by the two receivers.

The ambiguity resolution process typically takes between 30 seconds and 1 minute. The time the process takes is dependent on the number of satellites tracked with the process taking longer if only a relatively small number of satellites are being tracked.

If the GPS receiver does not, at any given time, receive the signals from a minimum number of satellites, the GPS receiver is unable to calculate position information. Thereafter, when the satellite signals are again available to the GPS receiver, that is, the satellites are "visible" to the receiver, the receiver must re-acquire the signals before the receiver can resume its position calculations. Signal re-acquisition involves re-synchronizing locally-generated codes to the codes in the received signals, in order to again track the signals. Following the signal re-acquisition process, the receiver must, when operating in precise differential mode, re-resolve the carrier ambiguities before precise positions become available.

During the re-acquisition operations, the user is without navigation information, and during the resolution process the user is without precise position information. Accordingly, the speed with which the receiver re-acquires the signals and resolves the carrier ambiguities is of paramount importance to the user.

The GPS satellites may become unavailable to the GPS receiver for various periods of time in, for example, urban environments, when the GPS receiver travels under a bridge, through a tunnel, or through what is referred to in the literature as an "urban canyon," in which buildings block the signals or produce excessively large multipath signals that make the satellite signals detrimental to use for position calculations. In addition, operating the GPS receiver while passing through natural canyons and/or areas in which satellite coverage is sparse, and so forth, may similarly result in the receiver being unable to track a sufficient number of satellites. Thus, in certain environments the navigation information may be available only sporadically, and GPS-based navigation systems may not be appropriate for use as a navigation tool.

One proposed solution to the problem of interrupted navigation information is to use an inertial system to fill-in whenever the GPS receiver cannot observe a sufficient number of satellites. The inertial system has well known problems, such as the derivation of the initial system (position, velocity and attitude) errors as well as IMU sensor errors that tend to introduce drifts into the inertial position information over time. It has thus been proposed to use the GPS position information to limit the adverse effects of the drift errors on the position calculations in the inertial system. Further, it has been proposed to provide inertial position and velocity information to the GPS system, to aid in signal re-acquisition and in the process to resolve ambiguities. While such systems are discussed as being desirable, we are not aware of any GPS receiver prior to the receiver described in a co-pending application Ser. No. 10/162,287 entitled INERTIAL GPS NAVIGATION SYSTEM, which is assigned to a common assignee and incorporated herein in its entirety by reference, that in real time combines the information from GPS and inertial sub-systems to aid in signal re-acquisition and in the resolution of associated carrier ambiguities. The INS/GPS receiver thus provides accurate and uninterrupted navigation information in an environment in which sufficient numbers of GPS satellites are not continuously in view.

We have improved the INS/GPS receiver discussed above by modifying the INS Kalman filter to include GPS and/or other observables, i.e., measurements, that span previous and current times. As discussed in more detail below, the INS Kalman filter utilizes the observables to update position information relating to previous and current positions and propagate current position, velocity and attitude related information. The INS/GPS receiver thus produces even more accurate estimates of inertial position and velocity in the environment in which sufficient numbers of GPS satellites are not continuously in view.

SUMMARY OF THE INVENTION

The invention is an inertial ("INS")/GPS receiver that includes an INS sub-system which incorporates, into a modified Kalman filter, GPS observables and/or other observables that span previous and current times. The INS filter utilizes the observables to update position information relating to both the current and the previous times, and to propagate the current position, velocity and attitude related information.

The GPS observable may be delta phase measurements, and the other observables may be, for example, wheel pick-offs (or counts of wheel revolutions) that are used to calculate along track differences, and so forth. The inclusion of the measurements in the filter together with the current and the previous position related information essentially eliminates the effect of system dynamics from the system model. A position difference can thus be formed that is directly observable by the phase difference or along track difference measured between the previous and current time epochs. Further, the delta phase measurements can be incorporated in the INS filter without having to maintain GPS carrier ambiguity states.

The INS sub-system and the GPS sub-system share GPS and INS position and covariance information. The receiver time tags the INS and any other non-GPS measurement data with GPS time, and then uses the INS and GPS filters to produce INS and GPS position information that is synchronized in time. The GPS/INS receiver utilizes GPS position and associated covariance information and the GPS and/or other observables in the updating of the INS filter. The INS filter, in turn, provides updated system error information that is used to propagate inertial current position, velocity and attitude information. Further, the receiver utilizes the inertial position, velocity and covariance information in the GPS filters to speed up GPS satellite signal re-acquisition and associated ambiguity resolution operations.

The GPS/INS receiver uses particularly robust inertial processing, including the updating of position information relating to both current and previous times, to produce inertial position and covariance information from which the GPS sub-system can readily calculate theoretical pseudoranges and Doppler rates that are sufficiently close to the actual values, so as to significantly reduce the time it takes the receiver to re-acquire the satellite signals. The signal re-acquisition times are reduced even if the GPS satellites remain unavailable to the receiver for relatively long periods of time and/or the periods of unavailability occur relatively frequently, such as in a typical urban environment. Further, the inertial positions produced by the INS sub-system, which are based both on the inertial measurements and on the GPS and/or other available observables, are more accurate than the inertial positions that are based on the inertial measurements alone, even during long or frequent periods of satellite unavailability.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
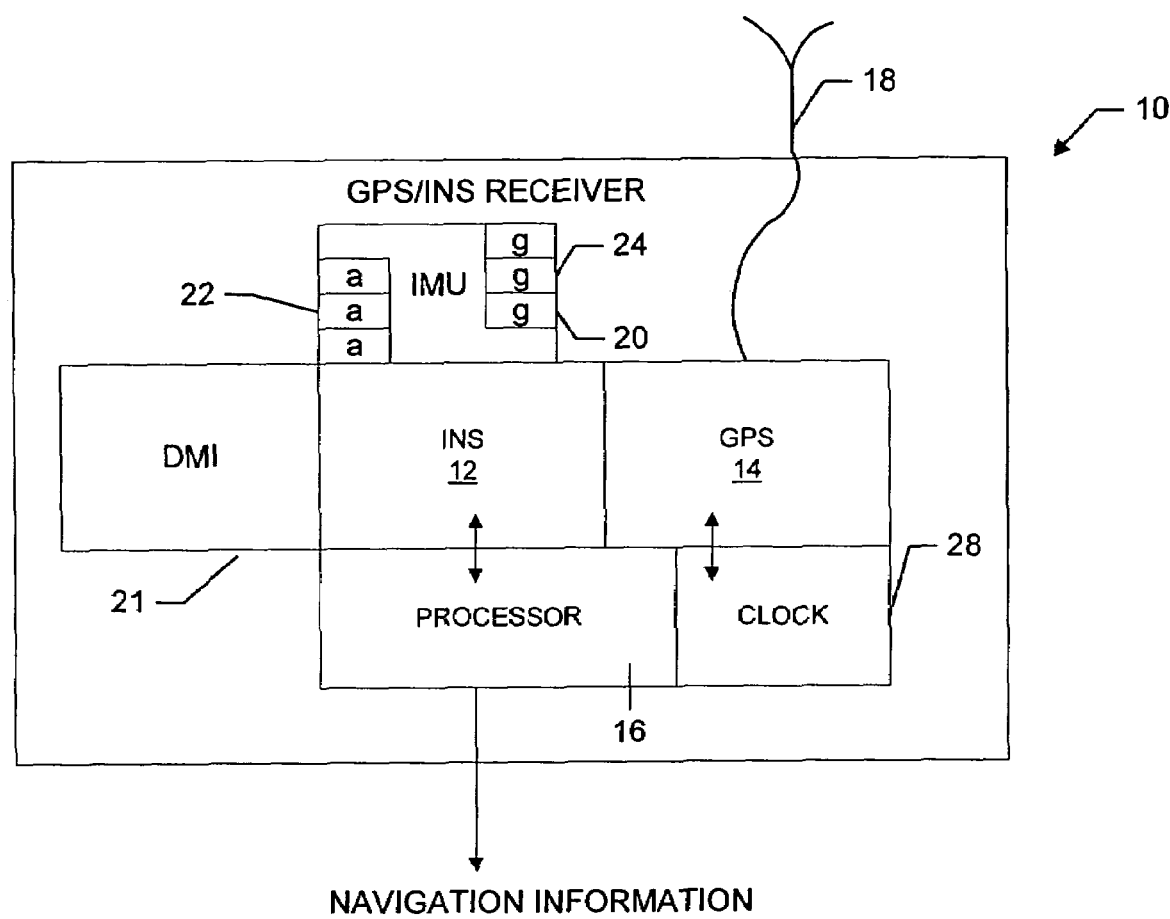
FIG. 1 is a functional block diagram of a GPS/INS receiver constructed in accordance with the invention.

Referring now to FIG. 1, a GPS/INS receiver 10 includes an INS sub-system 12 and a GPS sub-system 14 that operate under the control of a processor 16, to calculate GPS position and INS position, velocity and attitude information. The GPS subsystem processes the satellite signals received over an antenna 18. The INS sub-system receives measurements from an inertial measuring unit ("IMU") 20 that reads data from orthogonally positioned accelerometers 22 and gyroscopes 24. In addition, the INS sub-system may receive data from a distance measurement indicator ("DMI") 21, such as a wheel pick-off (not shown). The data from the IMU and, as appropriate, from the DMI, are time tagged with the GPS time maintained by a GPS-time clock 28, as discussed in more detail below, such that the two sub-systems can reliably interchange position-related information that is synchronized in time. The two subsystems operate together, through software integration in the processor 16, to provide position-related information between the sub-systems as predetermined times and/or in response to particular events. Further, the GPS sub-system provides GPS observables, such as delta phase measurements, to the INS sub-system at appropriate times. After processing, the receiver provides navigation information, such as position, velocity and/or attitude, to the user through, for example, an attached display device (not shown).

For ease of understanding, we discuss the processing operations of the two sub-systems without specific reference to the processor 16. The system may instead include dedicated GPS and INS sub-processors that communicate with one another at appropriate times to exchange information that is required to perform the various GPS and INS calculation operations discussed below. For example, the INS sub-processor communicates with the GPS sub-processor when IMU and, as appropriate, DMI data are provided to the INS sub-processor, in order to time-tag the data with GPS time. Further, the GPS sub-processor communicates with the INS sub-processor to provide the GPS observables and the GPS position information at the start of each measurement interval, and so forth. The DMI may instead communicate with the processor, such that DMI data is provided at the start of each measurement interval, and thus, the DMI measurements need not be time tagged.

For further ease of understanding we discuss the system operations first with GPS and IMU data only, and thereafter discuss the inclusion of the DMI data.

At start-up, the GPS sub-system 14 operates in a known manner to acquire the signals from at least a minimum number of GPS satellites and calculate pseudoranges to the respective satellites and associated Doppler rates. Based on the pseudoranges, the GPS sub-system determines its position relative to the satellites. The GPS sub-system may also determine its position relative to a fixed-position base receiver (not shown), either through the use of differential correction measurements generated at the base station or after resolving associated carrier cycle ambiguities.

Figure 4:
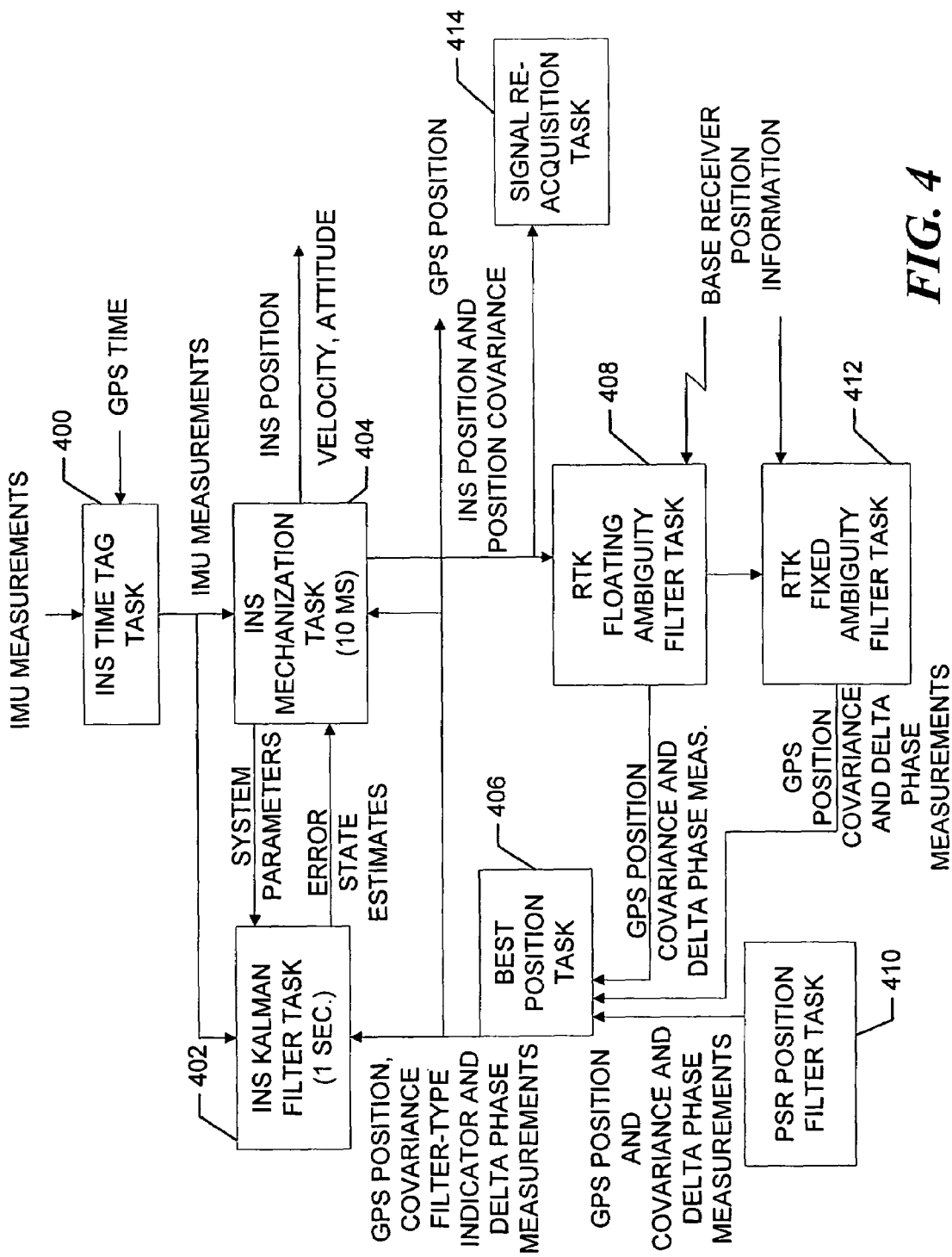
FIG. 4 is a functional block diagram of a GPS/INS receiver that incorporates a NovAtel OEM4 GPS receiver.

At the same time, the INS sub-system 12 processes the IMU data, that is, the measurements from the various accelerometers 22 and gyroscopes 24, to determine the initial attitude and velocity of the receiver. The INS sub-system further processes both the IMU data, the GPS position and associated covariance information, and the GPS observables, in the example, delta phase measurements, to set up various matrices for the INS Kalman filter (FIG. 4). At the start of each measurement interval, the INS sub-system updates the INS Kalman filter and provides updated error states to a mechanization process. The mechanization process uses the updated information and the IMU data to propagate, over the measurement interval, the inertial current position, attitude and velocity related information, with the associated inertial position and velocity errors being controlled by the GPS position and the GPS observables at the start of the measurement interval.

Figure 2:
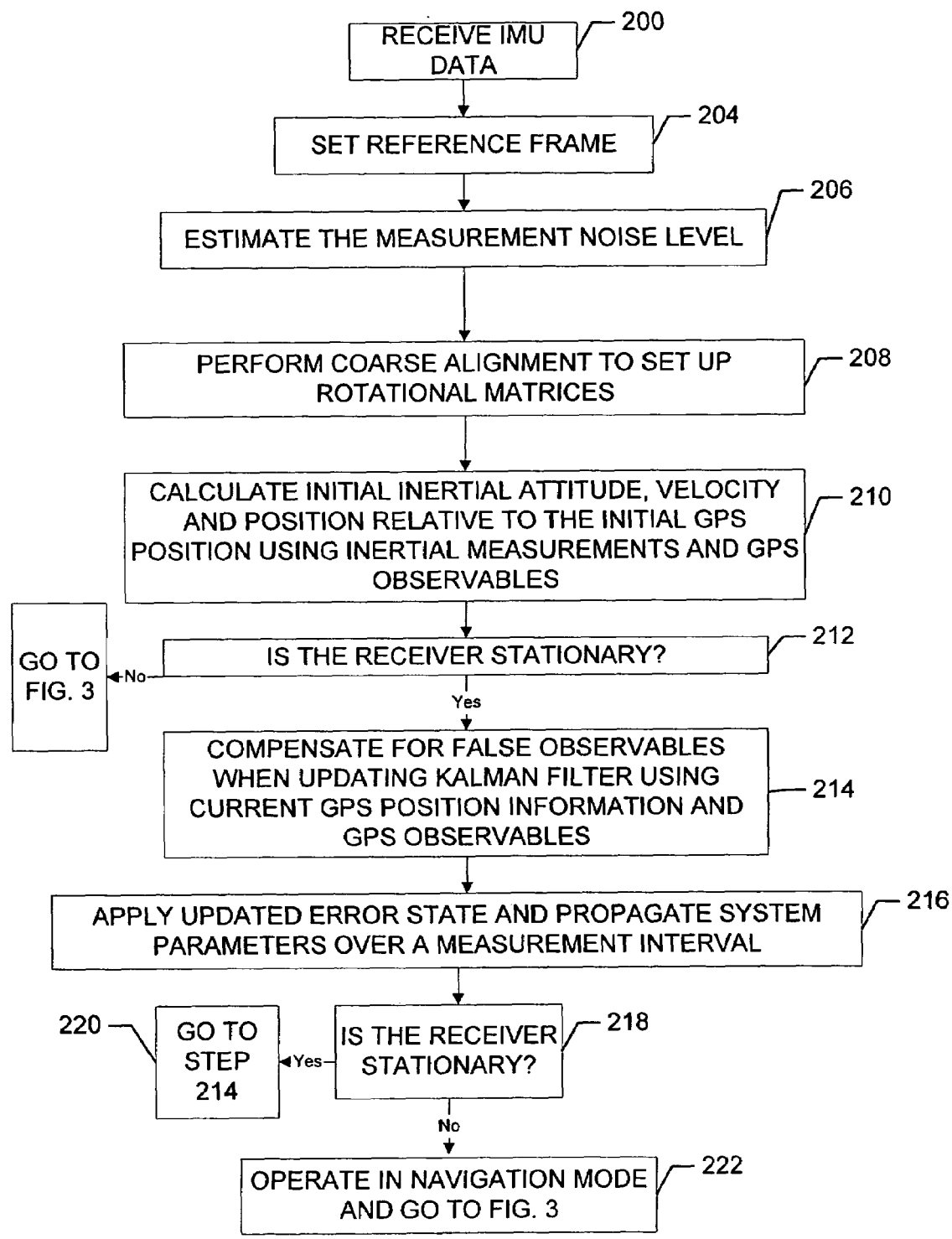
FIG. 2 is a flow chart of the INS start-up processing.

Referring now also to FIG. 2, at start-up the receiver 10 is presumed to be at rest, and the INS sub-system 12 determines the orientation of a reference, or body, frame for the accelerometer and gyroscope measurements (steps 202–204). The INS sub-system calculates the initial attitude represented as Euler angles relating the body frame to the ECEF frame. Accordingly, the y-axis of the measurement reference frame must not be aligned with the gravity vector.

To set the orientation of the reference frame such that the y-axis does not align with the gravity vector, the INS sub-system 12 compares the measurements from the various accelerometers, which are nominally assigned to x, y and z axes, to determine which measurement is largest in magnitude. The INS sub-system then re-assigns or maps the x, y and z axes among the accelerometers such that the z-axis has the largest positive acceleration magnitude, that is, such that the z-axis points up. The INS sub-system will then properly estimate the initial attitude, regardless of how the receiver is oriented.

The IMU 20 plugs into a port (not shown) of the processor 16 and through the port supplies accelerometer and gyroscope measurement data to the processor. In the current embodiment, the IMU is a Honeywell HG1900 MEMS IMU, and the INS sub-system assigns applicable initial uncertainty values and a scale factor, respectively, to the INS system elements and raw IMU measurements. Other IMUs may instead be incorporated into the system, and the sub-system then assigns initial uncertainty values and scale factors that correspond to the particular IMU.

The INS sub-system estimates the noise level on the IMU measurements (step 206) based on the standard deviation of the measured accelerometer signals. If the receiver moves before the noise level estimation is completed, the process uses as the estimate the nominal noise level value specified by the IMU manufacturer.

The steps 204 and 206 occur essentially simultaneously. Once the reference frame and noise level are determined, the INS sub-system 12 begins a coarse alignment process (step 208). The coarse alignment process sets up various rotational matrices that are used to transform measurement data to a computational frame, which in the example is the earth centered earth fixed, or ECEF, frame. The coarse alignment process is based on an assumed "local" position of the receiver, which is the initial GPS position provided by the GPS sub-system 14. The INS subsystem specifies three orthogonal vectors that are associated with the local position, namely, the gravity vector, the earth angular velocity vector, and the cross product of the two vectors. The INS sub-system then determines the same vectors and their cross product transformed to the reference, or body, frame, based on the measurements of the accelerometers 22 and gyroscopes 24. The two sets of three vectors form two matrices $S^l$ and $S^b$ which are related by the transformation:

$$S^b = R_l^b S^l \text{ or } (S^b)^T = (S^l)^T R_b^l$$

where $R_l^b$ is the rotation matrix used to transform vectors from the local level to the reference, or body, frame, and $R_b^l$ is the transpose of the rotation matrix:

$$R_b^l = ((S^l)^T)^{-1}(S^b)^T$$

Once $R_b^l$ is computed, the INS sub-system calculates a rotation matrix $R_b^e$, which is used to rotate the body frame measurements to the computational (ECEF) frame:

$$R_b^e = R_b^l R_l^e$$

The system also uses specific elements of the matrix $R_b^l$ to generate roll, pitch and azimuth state elements:

Roll=Arc Sin($R_{3,2}$)=Arc Sin($-f_y/g$)

Pitch=Arc Tan($-R_{3,1}$, $R_{3,3}$)=Arc Tan($f_x/g$, $-f_z/g$)

Azimuth=Arc Tan(($f_x\omega_z - f_z\omega_x$)/($Wg$ Cos($\phi$)), ($Wf_y$ Sin($\phi$)+$\omega_y g$)/($Wg$ Cos($\phi$)))

where $f_x$, $f_y$, $f_z$ are specific forces measured in the body frame by the $\omega_x$, $\omega_y$, $\omega_z$ are angular rates measured in the body frame by the IMU, W is the earth rotation rate, g is the magnitude of normal gravity, and $\phi$ is latitude.

The alignment accuracy over time is dependent on the noise on the gyroscope measurements and in particular on the noise on $\omega_x$ when the reference frame is aligned such that $\omega_x$ points east. Accordingly, the INS sub-system 12 uses the estimated noise level determined in step 206 in calculating the initial attitude and velocity. The initial GPS position is used to initialize the position element of the INS sub-system (step 210).

Coarse alignment ends after the earlier of a fixed length of time after the calculation of an initial GPS position or the system begins to move. As part of the coarse alignment, the attitude accuracy and INS measurement noise level is computed. After coarse alignment, the INS sub-system operates in navigation mode to propagate the inertial system parameters of current position, velocity, attitude and bias estimates, as discussed in more detail below. The propagation involves a modified Kalman filter process and a mechanization process. The INS Kalman filter process essentially updates system error and variance covariance information, including prior position related information, and propagates the variance covariance information. The mechanization process uses the updated system information and the IMU measurements to propagate the inertial system parameters of current position, velocity and attitude. Kalman filter processes, in general, estimate a series of parameters that describe and predict the behavior of a system. Kalman filters operate, respectively, with sets of state variables that describe errors in the system and associated variance covariance matrices that describe the current knowledge level of the state. The Kalman filter maintains an optimal estimate of the system errors and associated covariance over time and in the presence of external measurements through the use of propagation and updating processes.

To propagate the state and covariance from some past time to the current time, the Kalman filter propagation step uses knowledge of the state dynamic behavior determined from the physics of the system and the stochastic characteristics of the system over time. The generalized Kalman filter propagates the inertial state vector x and the state variance covariance matrix P as:

$$x(-) = \Phi x(+)$$

$$P(-) = \Phi P(+) \Phi^T + Q$$

where, for example, x(+) represents the state vector after update and x(−) represents the state vector after propagation, $\Phi$ is the state transition matrix, which is a time solution to a dynamics matrix F (discussed below), and Q is a matrix that represents the time propagation of the spectral densities of the state elements. The current INS sub-system feeds back the state of the system post update, and thus, the INS Kalman filter does not propagate a state vector x.

The generalized Kalman filter update step updates both the state and the covariance:

$$K = P(-)H^T(HP(-)H^T+R)^{-1}$$

$$x(+) = x(-) + K(z - Hx(-))$$

$$P(+) = (I - KH)P(-)$$

where z is the observation vector, R is the observation variance covariance matrix, H is a matrix that represents the linear relationship between the observation vector and the state vector, and K is the Kalman gain matrix. The generalized Kalman filter update step thus uses the linear relationship between the state and observation vectors in conjunction with the covariance matrices related to those vectors to determine corrections to both the state vector and the state covariance matrix.

The update step of the INS Kalman filter relates the IMU measurements as well as the GPS observables, in the example, delta phase measurements, to various elements in the system state based on a functional relationship that is modeled as a linear relationship. As discussed in more detail below, the state vector for the INS Kalman filter includes entries for both current and previous position related information. The state vector is initially set to the zero vector because any error estimates are initially applied to the system parameters of position, velocity, attitude, and also to bias terms, as discussed below.

The values initially assigned to the elements of the P matrix are based on the best knowledge available about the system after alignment. The values are related to the system parameters, the quality of the alignment, the estimated measurement noise level, and the type of GPS position information available initially, i.e., the uncertainties associated with the GPS filter used to produce the position information, as discussed in more detail below with reference to FIG. 4. The Q matrix elements corresponding to IMU measurements are generated from formulas that incorporate the IMU device specifications. The relevant system parameters used to generate these elements of Q are the accelerometer and gyroscope scale factor accuracy and linearity, the velocity random walk, the angular random walk, and the accelerometer and gyroscope measurement noise. The Q matrix elements that correspond to the delta phase measurements are derived from delta phase misclosures, where a misclosure is the difference between actual observations and the theoretical observations that are based on the current satellite set and the last set of GPS position estimates.

The state vector x has 21 elements—3 each for current position, velocity, attitude, gyroscope biases, accelerometer biases, IMU to GPS antenna offsets and previous position. The position, velocity and attitude states model errors in the ECEF frame, while the bias and offset states model errors in the body frame. The position, velocity, attitude and offset states are modeled as random walks, while the accelerometer and gyroscope bias states are modeled as Gauss-Markov processes.

The dynamics matrix for the 21-state system is:

$$F = \begin{bmatrix} 0 & I & 0 & 0 & 0 & 0 & 0 \\ N & 2\Omega_{ie}^e & F & 0 & R_b^e & R_b^e\Omega_{eb}^b & 0 \\ 0 & 0 & \Omega_{ie}^e & R_b^e & 0 & 0 & 0 \\ 0 & 0 & 0 & -\beta_g & 0 & 0 & 0 \\ 0 & 0 & 0 & 0 & -\beta_g & 0 & 0 \\ 0 & 0 & 0 & 0 & 0 & 0 & 0 \\ I & 0 & 0 & 0 & 0 & 0 & 0 \end{bmatrix}$$

The $R_b^e \Omega_{eb}^b$ term is required for the differential equation $$\delta\dot{v}^e = \dot{R}_b^e \delta O^b = R_b^e \Omega_{eb}^b \delta O^b$$

which links the velocity error rate to errors in the body frame offset between the IMU and the GPS antenna. The N term, which links errors in velocity error rate to errors in position, is the matrix tensor of the derivatives of the normal gravity vector parameterized in the ECEF frame with respect to position evaluated at the current position of the receiver. The F term is a skew symmetric sub-matrix of acceleration elements parameterized in the computational (ECEF) frame. The elements of F are generated from the raw delta velocity measurements (transformed to the ECEF frame) accumulated over ½ second time intervals, which is the delta time used for the state covariance propagation, as discussed below. The $\beta_g$ and $\beta_a$ terms are time constants of the Gauss-Markov processes which model the gyroscope and accelerometer bias states, respectively. These terms are derived from the accelerometer and gyroscope random walk characteristics, which are specified by the IMU manufacturer.

The rotation matrix $R_b^e$ transforms gyroscope bias errors to the ECEF frame and applies them directly to the attitude error rates, and similarly transforms the accelerometer bias errors to the ECEF frame and applies them directly to the velocity error rates. Specifically, the transformation $$d\delta v/dt_e = R_b^e d_a^b$$

relates the velocity error rate in the ECEF frame to accelerometer biases in the body frame, and the transformation $$d\epsilon/dt_e = R_b^e d_g^b$$

relates the attitude error rate in the ECEF frame to gyroscope biases in the body frame.

As discussed, the state information is fed back into the mechanization process after every update. The updated state is then set to the zero vector, and there is no propagation of the state in the INS Kalman filter propagation step. The INS Kalman propagation step is thus simplified computationally by propagating only the variance covariance matrix as:

$$P(-) = \Phi P(+)\Phi^T + Q$$

The propagation step is performed once per ½ second, and thus, twice per 1 second measurement interval, to avoid degradation problems in high dynamic environments. A ½ second propagation makes the assumption of constant coefficients in the dynamics matrix a reasonable one. Further, the ½ second propagation allows for a first order solution of that matrix system of differential equations, with $\Phi = I + \Delta t F$ a reasonable approximation. The INS Kalman filter propagation step computations can be further simplified by using only the non-zero elements of the transition matrix $\Phi$ in pre- and post-P multiplication steps.

As discussed above, the level of noise on the IMU measurements is a source of error, and it must thus be taken into account in the INS Kalman filter. The velocity and attitude states are modeled as random walks and the basic process noise values applied to these states is a function of the noise levels on the accelerometers and gyroscope measurements, respectively. Additional process noise is applied to the velocity states in the presence of specific force changes and to the attitude in the presence of rotation, in order to allow the system to adapt to the effects associated with unmodeled scaling errors. The process noise is based, at least in part, on a combination of associated accuracy and linearity terms supplied by the IMU manufacturer.

If the GPS position indicates that the receiver is stationary at the start of the navigation mode, the INS sub-system performs a process to reduce the effect of noise-induced "false observables" (steps 212, 214).

Due to accelerometer and gyroscope biases and noise on the measurements, the INS sub-system measurements indicate that the receiver is moving. There is a link between the velocity error rates and errors in the attitude state through the F matrix. Thus, without compensating for the associated false observable, the accuracy of the attitude estimate is essentially limited by the uncertainties in the biases, which results in the attitude variance estimate being smaller than, in theory, it should be, and also a decrease in the azimuth standard deviation. To compensate, the INS sub-system averages the acceleration observations used to produce the elements of the F matrix.

A second false observable relates to the H matrix and specifically to a component of $R_b^e$ that rotates the estimated IMU to GPS antenna offset from the reference frame to the computation frame (ECEF). During convergence, and depending on the quality of the coarse alignment, the azimuth component of the $R_b^e$ matrix can vary by as much as 50 degrees. This causes the gain elements which are related to the offset states that are normally unobservable when the receiver is stationary to become non-zero. The result is a reduction in the variance of the offset elements in the P matrix, such that the offset vector is slow to converge and it often converges to the wrong value once the receiver starts to move. Accordingly, to compensate the INS sub-system uses the initially-defined $R_b^e$ matrix while the receiver remains stationary, which ensures that the theoretically unobservable portions of the offset states remain unobservable until the receiver starts to move. When the receiver moves, the associated rotation is reflected in the P matrix off-diagonal terms, which correctly allow the offset state elements to become observable.

To speed Kalman filter update operations, the INS sub-system may omit the IMU to GPS antenna offset information from the state vector. Accordingly, the processing associated with second false observable is then omitted from the real-time processing operations.

As discussed above, a GPS observable, namely, delta phase measurements, is included in the INS Kalman filter. The delta phase measurements represent an integrated velocity over time and provide an estimate of the change in receiver position over time in the direction of the satellite generating the phase. The receiver removes the clock biases that are included in the delta phase measurements, such that the change in position is directly observable from the measurements. Specifically, the GPS sub-system removes the receiver clock biases from the delta phase measurements by differencing the delta phase measurements across satellites. The underlying phase measurements are thus double differenced across time and the satellites, to remove both clock rate and receiver clock offset biases. The single difference delta phase, that is, the phase difference across time is:

$$\Delta\phi_{t1t2}{}^j = H^j(x_{t1}-x_{t0})^T + \Delta\text{Clock}$$

where H is the vector $H^j=[-\Delta x^j/R^j, -\Delta y^j/R^j, -\Delta z^j/R^j]$ and $x_{t1}-x_{t0}$ is the vector of position differences between $t_1$ (the current time) and $t_0$ (the previous time) with respect to satellite j and where, for example, $\Delta x^i = x^i - x_r$, $x^i$ is the x axis component of the position of satellite "i", $x_r$ is the position of the receiver with respect to the ECEF frame, and $R^i = ((\Delta x^i)^2 + (\Delta y^i)^2 + (\Delta z^i)2)^{1/2}$ represents estimate of the geometric range to the satellite from the receiver.

The double difference, that is, the difference of the delta phase across satellites, is:

$$\nabla\Delta\phi_{t1t2}{}^{ij} = \nabla H^{ij}(x_{t1},0,0,0,\ 0,0,0,\ 0,0,0,\ 0,0,0,\ x_{t0})^T$$

where $\nabla H^{ij}$ is $$\nabla H^{ij} = [\Delta x^j/R^j - \Delta x^i/R^i,\ \Delta y^j/R^j - \Delta y^i/R^i,\ \Delta z^j/R^j - \Delta z^i/R^i,$$
$$0,0,0,\ 0,0,0,\ 0,0,0,\ 0,0,0,\ 0,0,0,\ -x^i/R^i + \Delta x^j/R^j,$$
$$-\Delta y^i/R^i + \Delta y^j/R^j,\ -\Delta z^i/R^i + \Delta z^j/R^j]$$

The double difference H matrix requires that both the current position and the position at the last epoch are available, as discussed above, and thus all position state elements are affected by the delta phase measurements. The delta phase measurements are provided to the INS Kalman filter as long as at least two GPS satellites are in view, that is, as long as the phase measurements can be double differenced to remove the clock biases. The set of satellites in view at a given time need not be the same satellites that were in view at the previous time.

The propagation step of the INS Kalman filter is modified to support the dynamics equations for the random walk model that involves both the prior and the current positions. Further, the INS Kalman filter is modified to transfer the current position elements to the prior position spot in the state vector as part of the post update feedback. Accordingly, the current position after the previous update becomes the previous position after propagation. At the same time, the INS Kalman filter propagates the current position error according to the estimated velocity error. To do this, the transition matrix becomes:

$$\Phi = \begin{bmatrix} I & I\Delta t & 0 & 0 & 0 & 0 & 0 \\ N\Delta t & I+2\Omega_{ei}^e\Delta t & F\Delta t & 0 & R_b^e\Delta t & R_b^e\Omega_{eb}^b\Delta t & 0 \\ 0 & 0 & I+\Omega_{ei}^e\Delta t & R_b^e\Delta t & 0 & 0 & 0 \\ 0 & 0 & 0 & e^{-\alpha\Delta t} & 0 & 0 & 0 \\ 0 & 0 & 0 & 0 & e^{-\beta\Delta t} & 0 & 0 \\ 0 & 0 & 0 & 0 & 0 & I & 0 \\ I & 0 & 0 & 0 & 0 & 0 & 0 \end{bmatrix}$$

Referring again to FIG. 2, if the receiver remains stationary, the receiver continues to perform steps 214 and 216. Once the receiver starts to move, the INS sub-system 12 operates in steady-state navigation mode (step 222).

Figure 3:
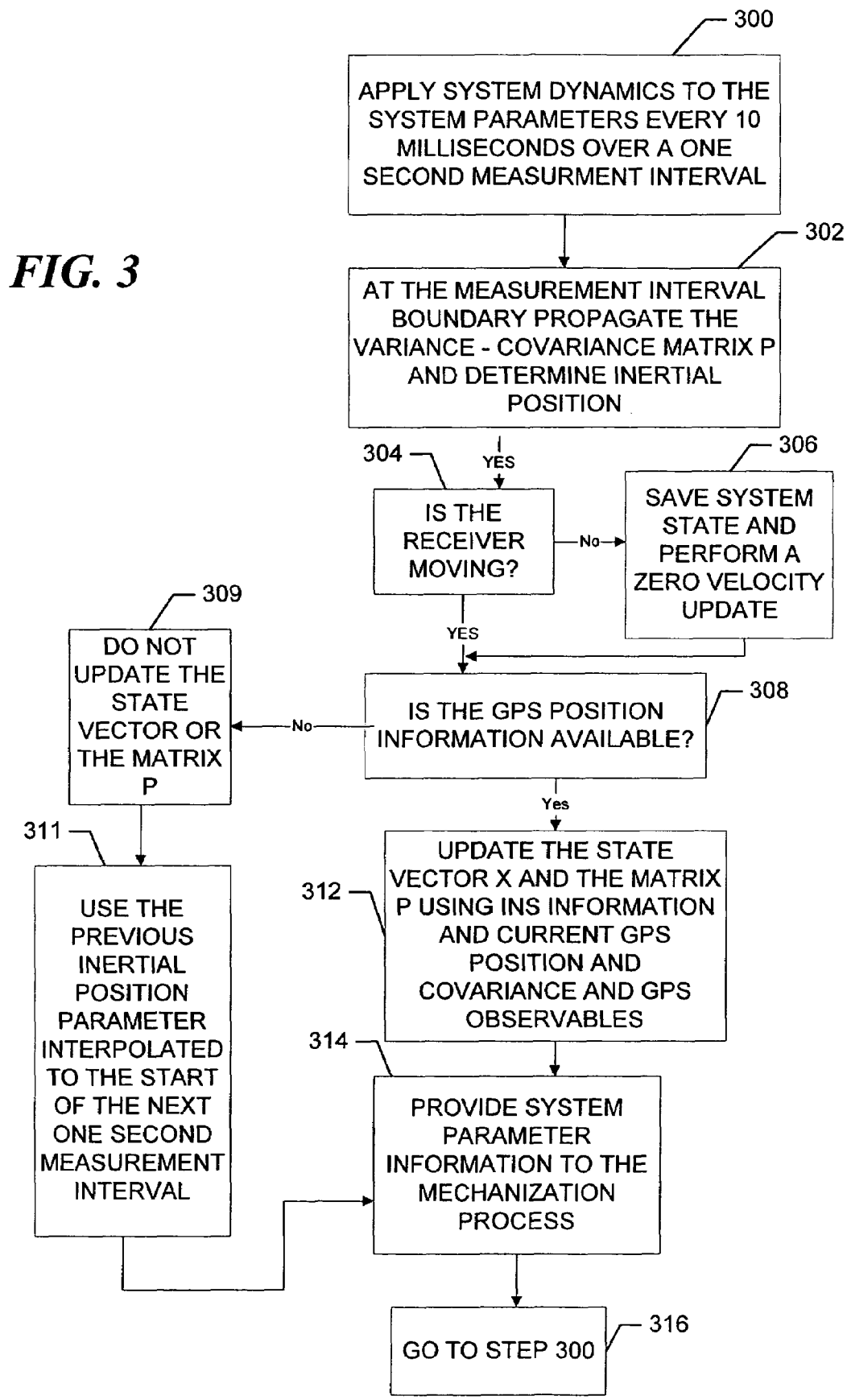
FIG. 3 is a flow chart of INS steady-state processing.

Referring now to FIG. 3, the INS Kalman filter propagates the inertial current position, velocity and altitude over a one second measurement interval with the receiver dynamics applied every ten milliseconds, as discussed with more detail below. At the one second mark, the INS Kalman filter propagates the covariance matrix P and determines its inertial position at the one second boundary, interpolating as necessary. At the same time the INS sub-system determines if the receiver is moving (step 304). If not, the receiver saves in non-volatile memory, the system components, that is, the state covariance matrix, the position, velocity, attitude, biases (gyroscope and accelerometer) and offset elements. The saved system components area combination of the initial conditions, the integrated transformed gyroscope and acceleration measurements, and the accumulated states. The INS sub-system also performs a "zero-velocity update" or ZUPT, as discussed below (step 306).

Otherwise, if the receiver is moving, the INS system waits for the GPS observables, in the example, the delta phase measurements, and the GPS position, assuming the receiver has a sufficient number of the GPS satellites then available to it at the 1 second GPS boundary. Once the GPS observable and the GPS position information are supplied by the GPS sub-system, the INS Kalman filter process performs an update step (steps 308, 312). Thereafter, the Kalman filter provides the error state information and updates to the mechanization process, which again applies the system dynamics to the system parameters (steps 314, 316).

For a ZUPT to occur, the difference between the magnitudes of an averaged measured acceleration vector and the gravity vector has to be within a predetermined threshold range, and also the magnitude of an averaged measured angular rate vector has to be below a predetermined threshold. The velocity update to the Kalman filter for a ZUPT uses an observation covariance matrix that is based on the thresholds used to detect the stationary condition. At the same time the Kalman filter uses GPS position to update the state, but since the system is stationary, the GPS position is de-weighted nine out of ten times unless the position is based on fixed integer ambiguities. This deweighting prevents an inordinate reduction of the state variances as a result of the correlated measurement errors that occur on the GPS measurements when the system is stationary.

If GPS position information is not available, e.g., if a sufficient number of satellites are not available, and the receiver is moving, the INS Kalman filter does not perform an update (steps 304, 308, 309). The propagated covariance matrix then reflects that no GPS position is available. The interpolated inertial position, which is based on the inertial measurements and the available GPS observables, is then used as the receiver position at the start of the next one second measurement cycle (step 311). If, however, the receiver is stationary when the GPS position information is not available, the receiver saves the state of the system and the INS Kalman filter performs a ZUPT but no position or delta phase update, (steps 306, 308, 309), and the receiver again uses the interpolated inertial position as the receiver position at the start of the next measurement cycle (step 311).

As discussed below, the Kalman filter process may deweight certain observation covariance information associated with certain observation times when, for example, particular GPS filters are used to determine GPS position, whether or not the receiver is stationary. The de-weighting is similarly used to compensate for time correlated measurement noise.

In many environments, for example, urban canyons, the receiver may experience severe multipath errors. To prevent the GPS positions generated in these environments from corrupting the inertial system parameters via the Kalman filter update, the INS sub-system places a six sigma bound on the information before the information is used to update the Kalman filter.

The mechanization process (step 314) combines the initial conditions determined during course alignment with the IMU data, to keep the INS sub-system parameters current. Thereafter, the mechanization process uses the conditions associated with the ending boundary of the previous measurement interval, and propagates the INS sub-system parameters, that is, current position, velocity and attitude, from the end boundary of the previous measurement interval to the end boundary of the current measurement interval.

The mechanization process uses the measured delta velocities and delta angles in the solution of the fundamental differential equations:

$$dR_b^e/dt = R_b^e(\Omega_{ei}^b + \Omega_{ib}^b)$$

and $$d^2r^e/dt^2 = R_b^e f^b + g^e - 2\Omega_{ie}^e dr^e/dt$$

The first differential equation maintains the attitude relationship between the reference, or body, frame and the computational frame (in this implementation ECEF). The attitude is maintained as a quaternion, which is somewhat more efficient than a 9 element direction cosine solution. As a consequence, the transformation matrix $R_b^e$ is recomputed every sampling time from the quaternion elements:

$$R_b^e = \begin{bmatrix} r_{11} & r_{12} & r_{13} \\ r_{21} & r_{22} & r_{23} \\ r_{31} & r_{32} & r_{33} \end{bmatrix}$$

$$= \begin{bmatrix} q_1^2 - q_2^2 - q_3^2 + q_4^2 & 2(q_1q_2 - q_3q_4) & 2(q_1q_3 + q_2q_4) \\ 2(q_1q_2 + q_3q_4) & q_2^2 - q_1^2 - q_3^2 + q_4^2 & 2(q_2q_3 - q_1q_4) \\ 2(q_1q_3 - q_2q_4) & 2(q_2q_3 + q_1q_4) & q_3^2 - q_1^2 - q_2^2 + q_4^2 \end{bmatrix}$$

The second differential equation maintains the relative position and velocity of the receiver. The $2^{nd}$ order equation can be used to generate two first order equations by introducing a vector $v^e$ to represent velocity in the computational (ECEF) frame:

$$dr^e/dt = v^e$$

$$dv^e/dt = R_b^e f^b + g^e - 2\Omega_{ie}^e dr^e/dt$$

In the equation for $dv^e/dt$, the effects of gravity and the Coriolis force may be removed from the measured specific forces transformed to the computational (ECEF) frame. The frame transformation is accomplished via the rotation:

$$f^e = R_b^e f^b$$

The mechanization process applies receiver dynamics to the INS sub-system parameters once every 10 milliseconds. The inertial position is determined relative to the GPS position at the beginning of each GPS second. As GPS positions and GPS observables, i.e., positions and delta phase measurements, become available at the even GPS second, the Kalman filter process provides updated error states to the mechanization process, and the mechanization process uses the information in the calculations to propagate the system parameters over the measurement interval. The updated information serves to control the inertial system error growth.

Referring now to FIG. 4 we describe the operations of the GPS/INS receiver by way of an example that consists of an IMU and a NovAtel OEM4 dual frequency GPS receiver with software that has been modified such that the GPS processor can process the GPS and inertial measurements using the respective GPS and INS filters. The OEM4 can provide L1 and L2 pseudorange and carrier measurements, as well as single point, pseudorange differential and carrier-based differential GPS positioning. The GPS sub-system thus includes three GPS filters, namely, a pseudorange position filter 410 which is a pseudorange least squares position estimator that can operate in either single point or differential mode, a pseudorange/carrier RTK floating ambiguity filter 408 and a carrier-based RTK fixed ambiguity filter 412. A fourth filter, that provides low latency positions computed from the current local carrier measurements, predicted base station measurements and the best available ambiguities, is also part of the system, but is not material to the INS/GPS integration, so is mentioned here only in passing. The respective filters have different error characteristics, and are thus associated with different covariance matrices.

The position, covariance information and delta phase measurements from each GPS filter are provided to a best-position task 406, which selects a best position based on a minimum covariance trace. The task provides the selected position and associated covariance information, a filter-type indicator and associated delta phase measurements to the INS Kalman filter task 402. The GPS position information is also included in the navigation information that is provided to the user.

As discussed above, the Kalman filter task 402 de-weights a proportion of the covariance matrices provided by the GPS sub-system when particular GPS filters are used to determine the GPS position. Specifically, the Kalman filter process de-weights the covariance matrix 9 out of 10 GPS observation times when the receiver is stationary and the GPS position was generated in the pseudo-range (PSR) position filter 410 or, whether the system is stationary or not, and the position was generated in the floating ambiguity filter 408. Otherwise, the Kalman filter process uses the GPS covariance matrix directly for the updating.

For the INS processing the IMU provides the inertial measurements to an IMU task 400. The IMU also produces a pulse that coincides with the first byte of the information. The pulse interrupts the processor 16, which provides the GPS time from the GPS clock to the IMU task. The IMU task, in turn, time tags the inertial measurements with the GPS time. The inertial position based on the measurement data is thus time synchronized to a GPS position.

As discussed above, a mechanization task 404 processes the IMU data to propagate inertial position, attitude and velocity every 10 milliseconds in accordance with the receiver dynamics. At the 1 second boundaries, the inertial position and velocity with their associated covariance information, which are interpolated to the one second boundary, are sent by the mechanization process to the INS Kalman 402, a signal re-acquisition task 414 and the GPS RTK floating point ambiguity filter 408. The INS Kalman filter updates the error states using this information, and the delta phase measurements, GPS position and associated covariance, which are collected at the 1 second GPS boundaries.

At the measurement interval boundaries, the Kalman filter task 402 provides updated error states to the mechanization task 404. The mechanization task then includes the error state information in its propagation calculations for that measurement interval. The mechanization task also provides various propagated system parameters to the user as part of the navigation information, as discussed above. At times that sufficient numbers of satellites are not available to the receiver, the receiver omits the GPS position in the navigation information and, as appropriate, uses the inertial position. At the same time, the GPS sub-system uses the inertial position, velocity and covariance information to re-acquire the satellite signals.

The signal re-acquisition task 414 requires the instantaneous code and Doppler rate of a given satellite signal as seen by the receiver in order to synchronize a local code generator to the code in the satellite signal. To determine the instantaneous code, the signal re-acquisition task uses the inertial position, in conjunction with the receiver clock offset and the known satellite position, to generate the theoretical pseudorange to the satellite. The GPS sub-system then re-sets the local code generator to an appropriate code chip based on the theoretical pseudorange.

To determine theoretical Doppler rate, the signal re-acquisition task projects the inertial velocity onto the satellite line of sight vector and uses the resulting line of sight velocity in conjunction with the receiver clock offset and satellite motion to calculate the theoretical Doppler rate for the satellite. The theoretical Doppler rate is then used in the GPS sub-system to set the Doppler controls for the local code generator.

The GPS sub-system calculates the theoretical pseudoranges and Doppler rates for each observable satellite, in turn. Assuming the inertial position and velocity are close to the actual receiver position and velocity, the local code generator produces a code that is close in phase to the corresponding code in the received satellite signal. Thus, as soon as each satellite is available, the GPS sub-system can quickly produce the correlation measurements that are used to determine GPS position.

The GPS sub-system must also resolve cycle ambiguities in order to determine the GPS position relative to the fixed-position receiver. The GPS sub-system first estimates the floating ambiguities associated with the RTK floating ambiguity filter 408. When the position is accurate as represented by the associated covariance, the GPS sub-system initializes a search space for the RTK fixed ambiguity filter 412, and the fixed ambiguity resolution process can begin.

During the ambiguity estimation process, the GPS sub-system uses the inertial position and associated covariance matrix to set the floating ambiguity position and covariance. The floating ambiguity estimation process normally takes up to 20 or 30 seconds to initialize a search space for the integer ambiguity filter, but the inertial aiding allows the initialization of the fixed ambiguity filter to start as soon as signals become available, thus shortening the resolution process considerably.

As discussed above, the INS Kalman filter may also utilize other observables, such as, DMI measurements, for example, wheel pick-offs that are translated into along track differences. The INS sub-system collects the wheel pick-off measurements from the DMI at the 1 second GPS boundaries and uses the corresponding GPS position information, if available, to calibrate the wheel pick-off parameters for the measurement period. The INS sub-system then determines a corresponding change in position, i.e., the along track difference, as a geometric result based on a trajectory calculated using the inertial measurements taken over the same measurement period.

The change in position is directly observable with the along track difference, just as with the delta phase measurements. The along track difference provides the position change in geometric terms. The current position of the receiver can then be calculated using the along track differences and the GPS information from two or three GPS satellites. Further, the along track differences improve the geometric results of the position calculations when GPS information is available from 4 or more GPS satellites.

The GPS and other observable data are provided to the INS Kalman filter at the times the filter is updated. In the example above, the data is thus provided at the 1 second GPS boundaries. We have discussed the INS Kalman filter operations in terms of delta phase measurements and along track difference measurements. However, other observables may be used in addition to or instead of these particular observables. Further, we have described the time tagging of the inertial measurements in terms of a pulse produced by the IMU, where the pulse coincides with the first byte of the measurement data provided by the IMU. If, however, an IMU is used that does not produce the pulse, the IMU task may instead produce a pulse that corresponds to the time at which the first byte of data is provided to the task. The pulse causes the processor to read the count of a counter (not shown) that is slaved to GPS time, and the IMU task then reconstructs the corresponding GPS time from the count of the counter, as discussed in the co-pending application entitled INERTIAL GPS NAVIGATION SYSTEM, which is incorporated herein by reference.

What is claimed is:

1. An INS/GPS receiver including:
A. an antenna for receiving signals from a plurality of GPS satellites;
B. a GPS sub-system for
   acquiring and tracking the signals from the respective GPS satellites in view,
   determining GPS position and related covariance information, and
   producing associated delta phase measurements that are double differenced across both time and the GPS satellites;
C. an inertial measurement unit for making measurements associated with the acceleration and relative orientation of the receiver;
D. an INS Kalman filter that uses the inertial measurements and the delta phase measurements to update and maintain current and previous position related information and propagate current position, velocity and attitude related information; and
E. a mechanization task that determines inertial position, velocity and attitude based on the inertial measurements and the updated information produced by the INS Kalman filter.

2. The receiver of claim 1 further including
a distance measurement unit that provides a measurement that is associated with the distance traveled over a measurement interval; and
the INS Kalman filter further calculates an along track difference based on the measurement made by the distance measurement unit and a trajectory that is based on the inertial measurements over the same interval, the INS Kalman filter using the along track difference to update previous and current position related information and propagate current position, velocity and attitude.

3. A method of determining inertial position using an INS Kalman filter, the method including the steps of:
A. receiving from a GPS sub-system GPS position, covariance information and GPS observables of carrier phase that is double differenced over both time and GPS satellites that over time measure position change;
B. making acceleration and attitude related inertial measurements;
C. using the observable and inertial measurements to update and maintain position information relating to a current position and a previous position and using the inertial measurements and the updated information to propagate current position, velocity and attitude related information; and
D. using the propagated current position related information to determine an inertial position.

4. The method of claim 3 further including
making measurements and determining other GPS observables and non-GPS observables that over time measure position change; and
including the other GPS observables and the non-GPS observables in the updating of previous and current position information.

5. The method of claim 4 wherein the non-GPS observable is wheel revolutions.

* * * * *